Nov. 19, 1957 A. G. HERRESHOFF ET AL 2,813,491
FOOD FEEDING DEVICE
Filed June 14, 1954 2 Sheets-Sheet 1

INVENTORS.
Alexander G. Herreshoff,
Andrew A. White,
Robert M. Wagner.
BY Harness and Harris
ATTORNEYS.

Nov. 19, 1957     A. G. HERRESHOFF ET AL     2,813,491

FOOD FEEDING DEVICE

Filed June 14, 1954

INVENTORS
Alexander G. Herreshoff,
Andrew R. White,
Robert M. Wagner.
BY Harness and Harris
ATTORNEYS.

United States Patent Office 2,813,491
Patented Nov. 19, 1957

2,813,491

FOOD FEEDING DEVICE

Alexander G. Herreshoff, Grosse Pointe, Andrew R. White, Birmingham, and Robert M. Wagner, Rochester, Mich., assignors to Chrysler Corporation, Highland Park, Mich., a corporation of Delaware Application June 14, 1954, Serial No. 436,322

11 Claims. (Cl. 103—149)

This invention relates to a device for feeding liquefied food to patients through a tube and more particularly to a compact and inexpensive device of this type provided with means for varying the rate of feeding through a wide range.

It is a particular object of this invention to provide a food feeding device of such extreme simplicity that its cost will be low enough to permit its use freely by doctors and even by patients who may desire to purchase their own food feeding device.

It is a further object of the invention to provide a food feeding device which includes means for varying the rate of feeding so that, for example, 1000 cc. of liquefied food may be continuously pumped over a period which may be varied from say 30 minutes to around 8 or 10 hours. An optimum rate of feeding may thus be selected to correspond to the patient's condition and a supply of real food of a selected diet directly to the patient's digestive tract is facilitated where this is preferable to the generally accepted practice of providing intravenous injections of glucose.

Referring to the drawings.

Figures 1, 2:
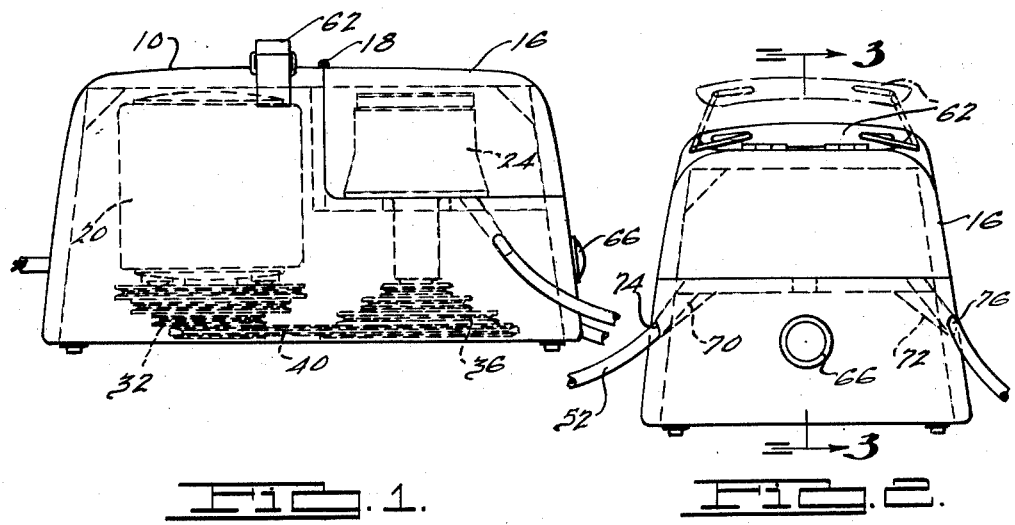
Fig. 1 is a side elevational view of the food feeding device.
Fig. 2 is a front elevational view thereof.
Figure 3:
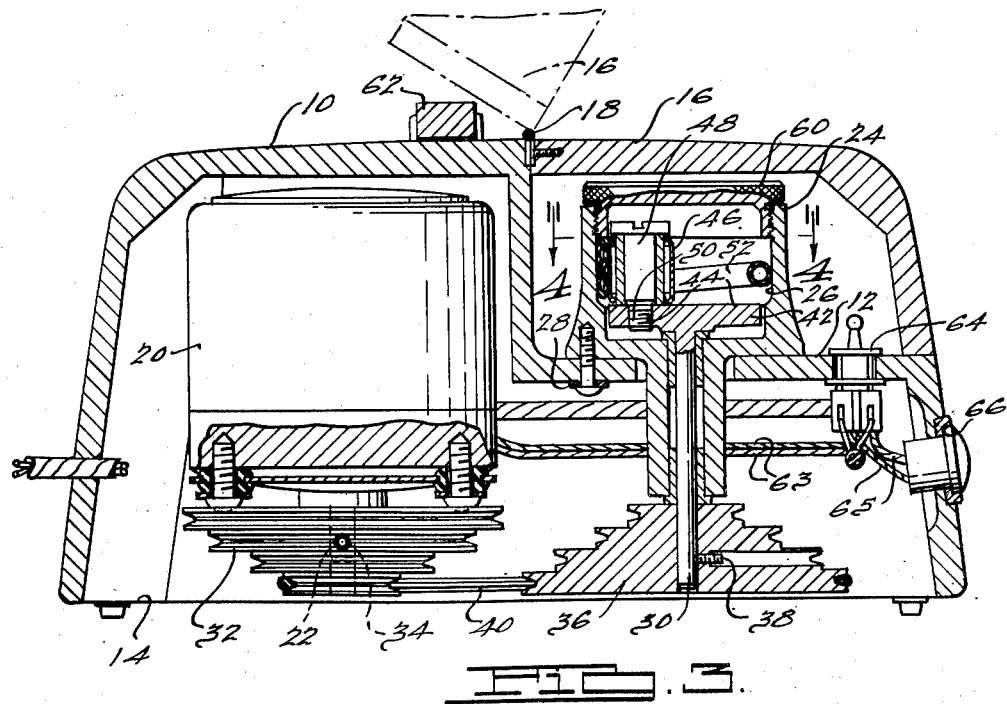
Fig. 3 is a vertical section taken on the line 3—3 of Fig. 2.
Figure 4:
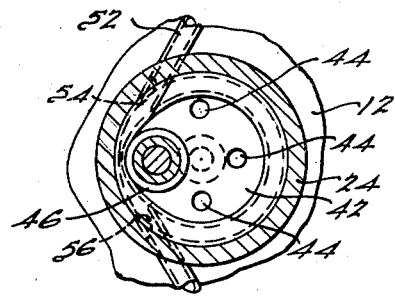
Fig. 4 is a partial horizontal section taken on the lines 4—4 of Fig. 3.
Figure 5:
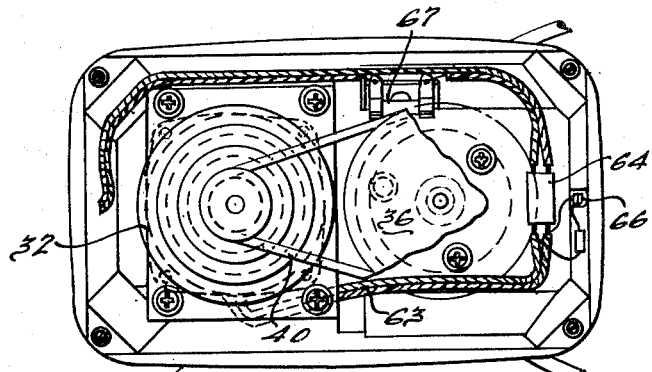
Fig. 5 is a bottom view of the device.
Figure 6:
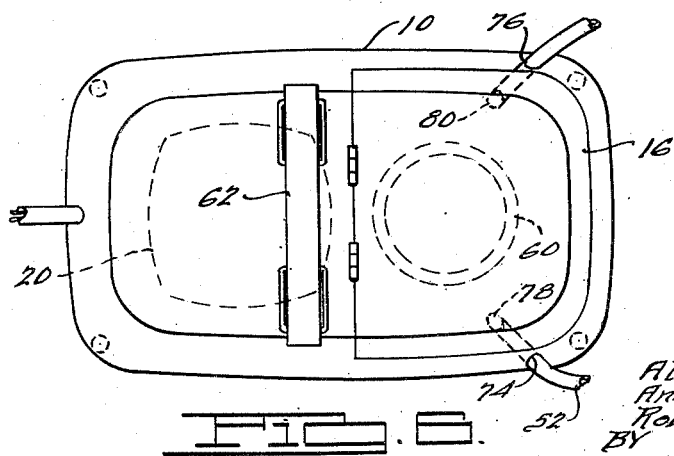
Fig. 6 is a top plan view thereof.

A casing 10 is provided with a depressed portion 12 in its upper surface and it should be noted that the casing 10 has an open bottom 14 and cover portion 16 which is hinged at 18 to conceal the depressed portion 12 and to provide access thereto.

An electric motor 20 is mounted within the casing 10 with its shaft 22 extending in a vertical direction and depending therefrom. The motor 20 is mounted within the casing 10 in that portion of the casing which extends to its full heighth as distinguished from the portion that is depressed.

A pump container 24 having a cylindrical inner surface 26 is mounted on the depressed portion 12 and retained in position by means of screws 28 which are accessible through the bottom of the casing 10. A shaft 30 penetrates the pump container 24 and extends in a vertical direction which is parallel to the motor shaft 22. The shaft 30 depends from the pump container 24 into the interior of the casing 10.

A cone pulley 32 of the stepped type is keyed to shaft 22 by a pin 34 and the pulley 32 preferably has the stepped portion of maximum diameter located in close proximity to the electric motor 20. A cone pulley 36 of the stepped type is keyed to shaft 30 by means of screw 38 and preferably has its step of maximum diameter located adjacent the lower terminus of shaft 30. A flexible belt 40, which may be of the rubber O ring type, extends around aligned steps of the pulleys 32 and 36 to provide a drive transmitting relationship between these pulleys. A manual positioning of the belt 40 on different steps of their respective pulleys serves to provide a variable speed ratio drive between the shafts 22 and 30.

Removal of screws 28 and screw 38 accommodates withdrawal of the entire pump container 24 for cleaning or repair.

A doctor or authorized nurse can readily change the rate of feeding by inverting the casing 10 and changing the position of belt 40 on the pulleys 32 and 36 and the absence of a bottom on the casing 10 facilitates this adjustment. However, this type of control of the speed ratio drive is sufficiently inconvenient to discourage meddling by the patient or unauthorized personnel.

The shaft 30 which penetrates the pump container 24 carries a plate 42 which extends radially therefrom. The plate 42 is provided with a plurality of threaded openings 44 which extend in a direction parallel to the shaft 30, but which are spaced at different radial distances therefrom on the plate 42. A roller 46 is rotatably mounted on a central stud 48 which has a depending thread portion 50. The depending thread portion 50 is adapted to be selectively installed in one of the threaded openings 44 which are spaced at different radial distances from the shaft 30 thereby to provide a plurality of roller stations. This accommodates mounting of the roller in different positions with the cylindrical roller surface spaced at selected distances from the inner cylindrical surface 26 of the pump container 24. This adjustment may be used to vary the rate of feed and to accommodate a tube 52 of different diameter.

An elastic tube 52 extends into the pump container 24 through an opening 54 and has a convolution abutting the cylindrical surface 26 of the pump container 24 and a portion extending out of the pump container through an opening 56. Rotation of shaft 30 and roller 46 by means of energization of an electric motor 20 thereby causes the roller to revolve within the pump container 24 and to bear against the elastic tube 52 to collapse successive portions of said tubing against the cylindrical surface 26 to effect a pumping of fluid through the tube 52.

The pump container 24 is preferably provided with a threadably removable top 60 and the casing 10 is provided with a handle 62.

The electric motor 20 is connected by means of conductors 63 with a manually operable switch 64 which is mounted on the depressed portion 12 of casing 10 within the cover 16 and a signal light 66 is mounted in an end wall of casing 10 and connected by conductors 65 in series with motor 20 and switch 64 so that when the motor is operating the light 66 is on. A fuse 67 is provided in conductors 63.

The casing 10 is provided with tubular passages 70 and 72 which extend upwardly from the respective sides of the casing toward the pump container 24. These passages 70 and 72 have entrant portions 74 and 76 respectively located on the side of the casing 10 below the depressed portion 12 and these passages 70 and 72 have terminal portions 78 and 80 respectively which are located in the depressed portion 12 of casing 10. The passages 70 and 72 thus provide outlets from the casing 10 for the elastic tubing 52 which are not dependent upon the cover 16 being open. The admission of fluid to the pump container 24 through the tube 52 and the discharge of fluid from the pump container 24 through the tubing 52 is accommodated while the cover portion is enclosing the pump container 24.

We claim:

1. A device for pumping liquid food to a patient comprising a casing defining a housing, said casing having an upper surface provided with a depressed portion extending from one end thereof, a pump device including a container mounted on said housing in said depressed portion, said casing including a movably mounted cover portion adapted to enclose said depressed portion and said pump container, said pump container having an inner cylindrical surface and said pump device further including an elastic tube and means formed in said container to accommodate the penetration of said container by said tube, said tube having a convolution abutting said cylindrical surface, a shaft rotatably mounted axially of said cylindrical surface, a roller having an axis parallel to said shaft and offset radially therefrom, said roller being carried by said shaft and adapted to collapse successive portions of said tubing against said cylindrical surface as said shaft is rotated, and driving mechanism mounted within the housing defined by said casing and operably connected to said shaft for driving said shaft.

2. A device for pumping liquid food to a patient comprising a casing, an electric motor mounted in said casing on a vertical axis and having a shaft depending therefrom, a rotary pump carried by said casing and having a shaft depending therefrom within said casing in parallel relationship to said motor shaft, drive transmitting means operably connected to each of said shafts to effect a drive of said pump shaft by said electric motor shaft, said pump including a container having an inner cylindrical surface mounted coaxially of said pump shaft, an elastic tube extending through said container and having a convolution abutting said cylindrical surface, a radially extending member carried by said shaft within said container, a roller, cooperating means carried by said roller and said member to accommodate selective pivotal mounting of said roller on said member at a plurality of stations with the roller axis parallel to said cylindrical surface at each station and with the radial distance between the station and the pump shaft being different for each station thereby to provide selective mountings for the roller so that in each mounting the roller will collapse successive portions of said tubing against said cylindrical surface as said pump shaft is rotated and the selective mounting of the roller at different stations being available to vary the degree of collapse of the tubing and the pump capacity.

3. A device for pumping liquid food to a patient comprising a casing, an electric motor mounted in said casing on a vertical axis and having a shaft depending therefrom, a rotary pump secured to said casing and having a shaft depending therefrom within said casing in parallel relationship to said motor shaft, drive transmitting means operably connected to each of said shafts to effect a drive of said pump shaft by said electric motor shaft, said pump including a container having an inner cylindrical surface mounted coaxially of said pump shaft, an elastic tube extending through said container and having a convolution abutting said cylindrical surface, a radially extending member carried by said shaft within said container, said member having a plurality of threaded openings each extending in a direction parallel to said pump shaft, said threaded openings being spaced at different radial distances from said pump shaft, a roller device having an element rotatably mounted on a central stud provided with a threaded extension adapted to be selectively mounted in said threaded openings thereby to provide selective mountings for the roller so that in each mounting the roller will collapse successive portions of said tubing against said cylindrical surface as said pump shaft is rotated and the selective mounting of the roller at different stations being available to vary the degree of collapse of the tubing and the pump capacity.

4. A device for pumping liquid food to a patient comprising a casing defining a housing, said casing having an upper surface provided with a depressed portion, a pump device including a container mounted on said housing in said depressed portion, said casing including a movably mounted cover portion adapted to enclose said depressed portion and said pump container, said pump container having an inner cylindrical surface and said pump device further including an elastic tube extending through said container and having a convolution abutting said cylindrical surface, a shaft rotatably mounted axially of said cylindrical surface, a roller having an axis parallel to said shaft and offset radially therefrom, said roller being carried by said shaft and adapted to collapse successive portions of said tubing against said cylindrical surface as said shaft is rotated, and driving mechanism mounted within the housing defined by said casing and operatively connected to said shaft for driving said shaft, said casing being provided with first and second tubular passages extending upwardly from the respective sides of said casing toward said container, each of said passages having an entrant portion located on the side of the casing below said cover portion and each of said passages having a terminal portion located in said depressed portion, said tubular passages being adapted to provide outlets from said casing for said tubing which accommodate the admission of fluid to said pump container through said tubing and the discharge of fluid from said pump container through said tubing while said cover portion is enclosing said pump container.

5. A device for pumping liquid food to a patient comprising wall structure defining a casing having an upper surface including a depressed portion adjacent one end of said casing, said depressed portion being provided with an opening extending therethrough, a rotary pump mounted on the exterior of said depressed portion with said depressed portion forming a seat for said pump, said pump having a shaft depending through the opening in said depressed portion into the interior of said casing, an electric motor mounted in said casing adjacent the other end thereof and having a vertical shaft depending therefrom, and drive transmitting means operably connected to each of said shafts to effect a drive of said pump shaft by said electric motor shaft, said pump including a cylindrical housing, a collapsible tube coiled within the housing and a roller carried by said pump shaft and adapted to revolve within said housing and bear against said tube to effect the pumping of liquid through said tube.

6. A device for pumping liquid food to a patient comprising wall structure defining a casing having an upper surface including two vertically offset substantially horizontal end portions joined by an intermediate section at an angle to the horizontal portions, said upper surface being provided with an opening extending therethrough, a rotary pump mounted on the exterior of said lower portion with said lower portion forming a seat for said pump, said pump having a shaft extending through the opening in said upper surface into the interior of said casing, an electric motor mounted in said casing below the higher vertically offset portion of said upper surface and having a shaft extending therefrom, and drive transmitting means operably connected to each of said shafts to effect a drive of said pump shaft by said electric motor shaft, said pump including a cylindrical housing, a collapsible tube coiled within the housing and a roller carried by said pump shaft and adapted to revolve within said housing and bear against said tube to effect the pumping of liquid through said tube.

7. A device for pumping liquid food to a patient comprising wall structure defining a casing having side walls and an upper surface including a depressed portion adjacent one end of said casing, said depressed portion being provided with an opening extending therethrough, a rotary pump mounted on the exterior of said depressed portion with said depressed portion forming a seat for said pump, said pump having a shaft depending through the opening in said depressed portion into the interior of said casing, an electric motor mounted in said casing adjacent the other end thereof and having a vertical shaft depending therefrom, drive transmitting means operably connected to each of said shafts to effect a drive of said pump shaft by said electric motor shaft, said pump including a cylindrical housing, a collapsible tube coiled within the housing and roller carried by said pump shaft and adapted to revolve within said housing and bear against said tube to effect the pumping of liquid through said tube, and said casing being provided with means forming a pair of passages each extending respectively through one of said side walls and said depressed portion of said upper surface whereby each of said passages is adapted to receive a portion of said tubing and limit its movement relative to said pump.

8. A device for pumping liquid food to a patient comprising a casing, said casing including sidewalls, end walls, and an upper wall structure, said upper wall structure including a first portion, a substantially horizontal second portion offset vertically from and arranged at a lower elevation than said first portion, said upper wall structure further including a laterally extending intermediate wall connecting said portions and said side walls and said second portion being provided with an opening extending therethrough, a rotary pump mounted on the exterior of said second portion with said second portion forming a seat for said pump, said pump having a shaft depending through the opening in said second portion of said upper wall structure an electric motor mounted on a vertical axis in said casing in the space provided below said first portion of said upper wall structure and having a shaft depending therefrom, drive transmitting means carried within said casing and operably connected to each of said shafts to effect a drive of said pump shaft by said electric motor shaft, and a cover structure hinged to said casing and movable to a first position cooperating with said intermediate wall and said horizontal second portion of said upper wall structure to enclose said pump, said hinged cover structure being swingable to a second position exposing said pump.

9. A device for pumping liquid food to a patient comprising a casing defining a compartment and including means defining an access opening to said compartment through the base of said casing, said casing further being provided with means defining a pump chamber having a cylindrical surface and including means to accommodate the penetration of said chamber by a tube, an elastic tube penetrating said chamber through said last mentioned means and further having a convolution abutting said cylindrical surface, a shaft rotatably mounted axially of said cylindrical pump chamber, a roller positioned within said chamber and carried eccentrically by said shaft to collapse the above mentioned convolution of said tube against said cylindrical surface as said shaft is rotated, an electric motor mounted within said compartment and variable speed ratio drive transmitting mechanism operatively connecting said electric motor and said shaft, said mechanism being accessible through said access opening for adjustment to vary the speed ratio drive thereof.

10. A device for pumping liquid food to a patient comprising a casing defining a compartment and including means defining an access opening to said compartment through the base of said casing, said casing further being provided with means defining a pump chamber having an open end and a cylindrical surface, a removable closure for said open end adapted to selectively close said chamber and provide access thereto, said last mentioned means further including means to accommodate the penetration of said chamber by a tube, an elastic tube penetrating said chamber through said last mentioned means and having a convolution abutting said cylindrical surface, a shaft rotatably mounted axially of said cylindrical pump chamber, a roller positioned within said chamber and carried eccentrically by said shaft to collapse the above mentioned convolution of said tube against said cylindrical surface as said shaft is rotated, an electric motor mounted within said compartment and variable speed ratio drive transmitting mechanism operatively connecting said electric motor and said shaft, said mechanism being accessible through said access opening for adjustment to vary the speed ratio drive thereof.

11. A device for pumping liquid food to a patient comprising a casing having wall structure defining a compartment and including means defining an access opening to said compartment through the base of said casing, said casing further being provided with means defining a pump chamber having a cylindrical surface and including means to accommodate the penetration of said chamber by a tube, an elastic tube penetrating said chamber through said last mentioned means and having a convolution abutting said cylindrical surface, said casing being provided with aperture means formed in said wall structure to accommodate penetration of said wall structure by said elastic tube to facilitate communication of said tube with a patient and a food source located on the exterior of said casing, a shaft rotatably mounted axially of said cylindrical pump chamber, a roller positioned within said chamber and carried eccentrically by said shaft to collapse the above mentioned convolution of said tube against said cylindrical surface as said shaft is rotated, an electric motor mounted within said compartment and variable speed ratio drive transmitting mechanism operatively connecting said electric motor and said shaft, said mechanism being accessible through said access opening for adjustment to vary the speed ratio drive thereof.

References Cited in the file of this patent

UNITED STATES PATENTS

| | | |
|---|---|---|
| 2,102,523 | Ferrara | Dec. 14, 1937 |
| 2,406,485 | Arnold | Aug. 27, 1946 |
| 2,483,924 | Moulinier | Oct. 4, 1949 |
| 2,564,160 | Jones | Aug. 14, 1951 |
| 2,662,666 | Lamport | Dec. 15, 1953 |
| 2,664,756 | Fismer | Jan. 5, 1954 |